United States Patent [19]

Michlmayr

[11] 3,728,366
[45] Apr. 17, 1973

[54] LIQUID/LIQUID EXTRACTION OF COBALT VALUES

[75] Inventor: Manfred J. Michlmayr, San Francisco, Calif.

[73] Assignee: Shell Oil Company, New York, N.Y.

[22] Filed: Apr. 5, 1971

[21] Appl. No.: 131,401

[52] U.S. Cl............260/439 R, 75/101 BE, 75/119, 260/515 M
[51] Int. Cl.........................C07f 15/06, C22b 23/00
[58] Field of Search......................260/439 R, 515 M; 75/119

[56] References Cited

UNITED STATES PATENTS 3,477,953   11/1969   Carlson.............................260/439 R

OTHER PUBLICATIONS

Garner et al. J. Am. Chem. Soc. 84 (1962) p. 4734–7.
Tsvetkov et al. J. General Chem. U.S.S.R. 37 (1967) p. 652–5.
Issleib et al. Chem. Berichte 93(1960) p. 803–8.

*Primary Examiner*—Patrick P. Garvin
*Assistant Examiner*—A. P. Demers
*Attorney*—Howard W. Haworth and Martin S. Baer

[57]        ABSTRACT

Selective extraction of cobalt from alkaline aqueous solutions of its salts with organic solutions of lower diphenylphosphinocarboxylic acids and their oxides is disclosed.

5 Claims, No Drawings

LIQUID/LIQUID EXTRACTION OF COBALT VALUES

BACKGROUND OF THE INVENTION

1. Field of the Invention

This invention relates to extractive hydrometallurgy. More particularly it relates to a process for the selective extraction of cobalt from alkaline leach liquors with non-aqueous solutions of certain phosphorous-containing carboxylic acids.

2. The Prior Art

A variety of hydrometallurgical techniques for processing cobalt-containing ores have been proposed. Alkaline leach conditions are recognized as effective for solubilizing cobalt values, as well as other metal values such as copper and nickel values, from ores.

The selective recovery of cobalt and other metals from these alkaline leach solutions poses special problems, however. Liquid/liquid extraction, a method useful for selective recovery of metal values such as cobalt from leach solutions, is generally not effective. The common extractant ligands used in such processes, such as aliphatic and naphthenic acids, tend to be non-selective in alkaline media, especially in the presence of ammonium ions. Ligands which would selectively extract cobalt values from alkaline leach solutions would be highly advantageous.

STATEMENT OF THE INVENTION

It has now been found that large proportions of cobalt values are selectively extracted from aqueous alkaline solutions when water-immiscible non-aqueous solutions of lower diphenylphosphinocarboxylic acids or their oxides are used as extracting agents. At alkaline conditions, these extracting agents selectively remove major proportions of cobalt values from aqueous solutions and thus separate the cobalt value from any copper or nickel values which may be present in the aqueous solution.

DETAILED DESCRIPTION OF THE INVENTION

The Extracting Agent

Suitable extracting agents include the lower diphenylphosphinocarboxylic acids and the corresponding oxides. Preferred are the lower diphenylphosphino aliphatic carboxylic acids and their oxides which are represented by the formula

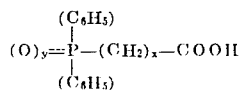

wherein $x$ is an integer from 1 to 12 inclusive, preferably 1 to 8 inclusive, and $y$ is either 0 or 1. Examples of these preferred materials are diphenylphosphinoacetic acid and the corresponding oxide, diphenylphosphinylacetic acid; diphenylphosphinopropionic acid and diphenylphosphinylpropionic acid; diphenylphosphinopentanoic acid and diphenylphosphinylphentanoic acid; and diphenylphosphinooctanoic acid and diphenylphosphinyloctanoic acid.

Very preferred extracting agents are the diphenylphosphinocarboxylic acids and corresponding oxides in accord with this formula wherein $x$ is an integer from 1 to 4 inclusive and $y$ is either 0 or 1.

Most preferred extracting agents are selected from the group consisting of diphenylphosphinoacetic acid; 3-(diphenylphosphino)-n-propionic acid, 4-(diphenylphosphino)-n-butyric and 5-(diphenylphosphino)-n-pentanoic acid and diphenylphosphinylacetic acid.

Mixtures of two or more extracting agents can also be employed.

The extracting agent is employed in dilute non-aqueous solution.

Solvent

As solvent for this solution materials are employed which are liquid at ambient conditions, which will dissolve at least about 0.1 gram equivalent weights of the phosphinocarboxylic acid extractant per liter (gew/l) and which are essentially immiscible with and only sparingly soluble in water. Organic solvents, both hydrocarbons and substituted hydrocarbons, are suitable with hydrocarbon solvents being preferred. Hydrocarbons which are very suitably employed include non-acetylenic, aromatic and saturated or olefinic aliphatic or cycloaliphatic materials such as, for example, benzene, toluene, the xylenes and aromatic fractions containing the same, and octane, decane, hexane, methylcyclohexane and pre-dominantly saturated aliphatic hydrocarbon fractions such as kerosene. Mixtures of solvents may be used and minor proportions of inert non-hydrocarbon organics such as substantially water-insoluble aliphatic ketones and alcohols, amines and amine oxides may suitably be incorporated into the preferred hydrocarbon solvent. Inert, water-insoluble oxygen or nitrogen-containing organic solvents may be employed. The concentration of extractant in the solution is suitably from about 0.1 gew/l to about 2.0 gew/l, and preferably from about 0.2 to 1.0 gew/l and most preferably from 0.2 to 0.5 gew/l. Lower concentrations may be employed but necessitate the use of excessive volumes of extracting solution.

The Aqueous Feedstock

The aqueous phase from which the cobalt value is selectively extracted contains at least one other metal value such as zinc, manganese, nickel and/or copper values and the like as well as ammonium ions and sufficient ammonia or alkali, such as alkali metal- or alkaline earth metal hydroxides, to render the solutions alkaline. In a preferred application of this invention, the aqueous solution comprises a leach liquor resulting from the ammoniacal leach of a cobalt, copper and nickel-containing ore, such as the pentlandite ores. Such solutions often contain from 1 to 10 grams/liter of cobalt value, 1 to 20 grams/liter of copper value and 10 to 100 grams/liter of nickel value.

A typical pentlandite leach solution contains:
2.3 grams/liter of cobalt value,
6.8 grams/liter of copper value, and
44 grams/liter of nickel value.

The extraction efficiency of the phosphino compound extractants of this invention is dependent on the pH of the aqueous solution. While suitable results are obtained at pH's as low as about 6 and as high as about 12, it is preferred to have the aqueous phase pH in the range from pH 7.0 to 11.0. Most preferred aqueous phase pH's are from about pH 7.5 to about 10.0. In these preferred ranges, cobalt extraction is quite complete while the extraction of other metal values, for example, alkali metals, alkaline earth metals, nickel, copper, zinc and the like is negligible.

Contacting

The extraction is conducted by contacting the solution of diphenylphosphinocarboxylic acid (or corresponding oxide) extracting agent with the alkaline aqueous feed. Suitably at least about 2 moles of extracting agent are used per mole of cobalt, preferably from 2 to 4 moles/mole of cobalt are employed. Optimal results are obtained with from 2 to 2.5 moles of extracting agent per mole of cobalt.

The extraction is conducted in a batch-type process or in a continuous process. In the latter modification, a several-stage continuous counter-current extraction is preferred. In any modification, agitation is provided during the process to insure adequate (intimate) phase contact. This agitation, frequently in the form of vigorous stirring, is usually continued until equilibrium between the phases is established, generally for a period of several minutes. Any emulsion which may form is broken, if required, in conventional manner by adding deemulsifying agents such as alcohols. Troublesome emulsions are not frequently encountered, however, and the extraction proceeds smoothly, as a rule, at ambient or any other convenient temperature at which the aqueous feed and the extracting agent are liquid. Preferably the temperatures are maintained below about 75°C, most preferably in the range of from about 0° to 70°C, so as to minimize any possible decomposition of the extracting agents. With the phosphino oxides, higher temperatures may be employed if desired.

If desired, the extracted cobalt values are separated from the organic extract as by treatment of the separated organic phase with water or dilute mineral acid, whereupon the cobalt values return to a second aqueous phase. The organic phase containing the extracting agent is suitably recycled whereas the other metal values are recovered from the initial aqueous phase by suitable means. The other metal values, such as nickel values, remaining in the aqueous raffinate subsequent to extraction with the phosphinocarboxylic acid extracting agent are recovered, if desired, by other selective extractions involving other extracting agents or by direct precipitation or reduction, such as with hydrogen sulfide or hydrogen.

At high pH's, some of the phosphorous-containing acid extracting agent may dissolve in the aqueous phase. This extracting agent may be recovered, if desired, by acidifying the aqueous phase as is done for cobalt stripping and then contacting it with a water-immiscible organic phase to recover the lost extracting agent.

The invention will be further described by the following examples which are provided for illustration and are not to be construed as limiting the invention.

EXAMPLE I

A 10 g Co/l (0.17 molar) aqueous solution of cobalt(II) sulfate was prepared in 2 m ammonia (pH=9.9). Oxygen was passed through the solution to convert most of the cobalt(II) to an oxidized species, probably the dinuclear complex $Co(II)-O_2$. This solution was then divided into seven 3 ml samples. Predetermined amounts of 2.8 molar $H_2SO_4$ were then added to the 7 samples, i.e., (0; 0.2; 0.5; 0.6; 0.7; 0.8; and 0.9 ml). These aqueous samples were then shaken at 25°C for 5 minutes with 5 ml of a 0.2 molar benzene solution of diphenylphosphinoacetic acid. The phases were separated and analyzed and the pH of the aqueous phase was determined. Major proportions of the cobalt were extracted into the organic phase, especially at pH's above about 8. These results are given in Table 1.

Table 1

| Equilibrium pH | Cobalt, % of total found in Aqueous Phase | in Organic Phase |
|---|---|---|
| 6.63 | 44.7 | 54.8 |
| 7.35 | 17.5 | N.D. |
| 8.10 | 7.8 | 92.8 |
| 8.73 | 7.8 | N.D. |
| 9.13 | 6.9 | 92.8 |
| 9.46 | 6.4 | 92.8 |
| 9.88 | 3.5 | 94.0 |

N.D. = not determined

Similar extractions were attempted with nickel sulfate and copper sulfate solutions. As shown in Table 2 negligible amounts of these metal values were extracted at high pH.

TABLE 2

| Equilibrium pH | Nickel, % In Aqueous Phase | In Organic Phase | Equilibrium pH | Copper, % In Aqueous Phase | In Organic Phase |
|---|---|---|---|---|---|
| 4.42 | 23 | 77 | 3.40 | 41 | 58 |
| 5.06 | 9 | 91 | 3.51 | 25 | 76 |
| 6.00 | 4 | 95 | 4.06 | 10 | 86 |
| 7.36 | 54 | 45 | 4.64 | 3 | 96 |
| 8.64 | 92 | 8 | 5.41 | <1 | 101 |
| 9.14 | 100 | <0.1 | 6.13 | <1 | 97 |
| 9.52 | 98 | <0.1 | 7.23 | 56 | 43 |
| 9.77 | 101 | <0.1 | 8.70 | 90 | 11 |
|  |  |  | 9.06 | 99 | <1 |
|  |  |  | 9.51 | 101 | <1 |
|  |  |  | 9.67 | 100 | <1 |

EXAMPLE II

Benzene solutions of diphenylphosphinoacetic acid (0.2 molar) (Extractant A), diphenylphosphinopropionic acid (0.2 molar) (Extractant B), diphenylphosphinobutyric acid (0.2 molar) (Extractant C), diphenylphosphinylacetic acid (0.2 molar) (Extractant D), were prepared. They were tested as extracting agents for cobalt, copper, and nickel using the general method of Example I. All these ligands showed similar excellent selective cobalt extraction characteristics. The results of these extractions are given in Table 3.

TABLE 3

| Extractant | Equilibrium pH | Cobalt In aqueous phase | Cobalt In organic phase | Nickel In aqueous phase | Nickel In organic phase | Copper In aqueous phase | Copper In organic phase |
|---|---|---|---|---|---|---|---|
| A | 6.3 | 49 | 48 | 2 | 98 | <1 | 97 |
|  | 7.5 | 17 | 81 | 54 | 45 | 64 | 35 |
|  | 8.7 | 8 | 91 | 92 | 8 | 90 | 11 |
|  | 9.1 | 7 | 93 | 100 | <1 | 99 | <1 |
|  | 9.7 | 4 | 94 | 101 | <1 | 100 | <1 |
| B | 7.3 | 18 | 83 | 50 | 48 | 55 | 44 |
|  | 9.1 | 8 | 93 | 99 | <1 | 98 | 1 |
|  | 9.4 | 6 | 93 | 100 | <1 | 99 | <1 |
| C | 9.0 | 7 | 92 | 98 | 1 | 98 | 1 |
|  | 9.6 | 5 | 96 | 99 | <1 | 99 | <1 |
| D | 8.3 | 9 | 93 | 90 | 10 | 86 | 14 |
|  | 8.9 | 7 | 93 | 97 | 3 | 95 | 6 |
|  | 9.6 | 6 | 93 | 99 | 1 | 100 | <1 |

I claim as my invention:

1. The process of selectively extracting cobalt values from an aqueous solution additionally containing at least one other metal value and having a pH in the range of from about 7.0 to about 11.0 which comprises the steps of:

A. intimately contacting the aqueous solution with a sparingly miscible organic phase of a solution of an extracting agent having the formula:

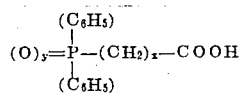

wherein $x$ is an integer from 1 to 8 inclusive and $y$ is 1 or 0, and

B. recovering organic phase enriched in said cobalt values.

2. The process in accordance with claim 1 wherein the aqueous solution additionally contains a metal value selected from the group consisting of copper values and nickel values.

3. The process in accordance with claim 1 wherein $x$ is an integer from 1 to 4 inclusive.

4. The process in accordance with claim 3 wherein the pH of the aqueous solution is in the range of from 7.5 to 10.0.

5. The process in accordance with claim 3 wherein the extracting agent is selected from the group consisting of diphenylphosphinoacetic acid, diphenylphosphinopropionic acid, diphenylphosphinobutyric acid, diphenylphosphinopentanoic acid and diphenylphosphinylacetic acid.

* * * * *